UNITED STATES PATENT OFFICE.

CHRISTINA MACKIE, OF NEWARK, NEW JERSEY.

WOOD-POLISH.

SPECIFICATION forming part of Letters Patent No. 581,398, dated April 27, 1897.

Application filed December 31, 1896. Serial No. 617,680. (No specimens.)

*To all whom it may concern:*

Be it known that I, CHRISTINA MACKIE, residing at Newark, in the county of Essex, State of New Jersey, have invented a new and useful Composition of Matter to be Used for Polishing all Kinds of Decorative Woods, Fine Furniture, and Pianos, of which the following is a specification.

My composition consists of the following ingredients, combined in the proportions stated, viz: for two gallons of the polish, raw linseed-oil, one gallon; wood-alcohol, one-half gallon; spirits of turpentine, one-fourth gallon; malt vinegar, six ounces; muriatic acid, three ounces; spirits of cloves, three ounces; butter of antimony, three ounces. The ingredients are to be thoroughly mingled by agitation.

In using the above composition on all fine ornamental woods, furniture, and pianos it gives a brilliant luster.

I am not aware that all of the ingredients of my composition have ever been used or offered for sale in this or any foreign country.

What I claim, and desire to secure by Letters Patent of the United States, is—

The herein-described composition of matter to be used for polishing decorative woods fine furniture and pianos consisting of raw linseed-oil wood-alcohol spirits of turpentine malt vinegar muriatic acid spirits of cloves butter of antimony in the proportions specified.

CHRISTINA MACKIE.

Witnesses:
CHARLES HAYES,
J. G. LARRABEE.